Oct. 4, 1966   R. W. F. CONWAY ETAL   3,276,346
TACHOMETER MECHANISM
Filed Nov. 29, 1963   2 Sheets-Sheet 1

REGINALD W. F. CONWAY
LYNN M. FRIZELLE
INVENTORS

BY R. Frank Smith
David P. Ogden
ATTORNEYS

Oct. 4, 1966  R. W. F. CONWAY ET AL  3,276,346
TACHOMETER MECHANISM

Filed Nov. 29, 1963  2 Sheets-Sheet 2

REGINALD W. F. CONWAY
LYNN M. FRIZELLE
INVENTORS

R. Frank Smith
David P. Ogden
ATTORNEYS

United States Patent Office 3,276,346
Patented Oct. 4, 1966

3,276,346
TACHOMETER MECHANISM
Reginald W. F. Conway and Lynn M. Frizelle, Rochester, N.Y., assignors to Eastman Kodak Company, Rochester, N.Y., a corporation of New Jersey
Filed Nov. 29, 1963, Ser. No. 326,843
9 Claims. (Cl. 95—89)

This invention relates to a tachometer mechanism and more particularly to a fluid drive tachometer mechanism subject to temperature viscosity variations.

In the art of tachometers and speedometers a most common example of a drive mechanism therefor is a magnetic coupling used in the usual automobile speedometer. In such a tachometer, a drive member coupled to a wheel of the automobile rotates in accordance with the angular velocity of the wheel and driven member coupled to an indicator is deflected in accordance with the angular velocity of the driving member as a function of the coupling therebetween. The gear ratios and dial markings of the system are arranged to provide an indication of miles per hour of kilometers per hour. Usually such speedometers include a magnet with the other member being an eddy current loss device such as an aluminum cup substantially surrounding the magnet.

Fluid coupling tachometer mechanisms are also known wherein the coupling between the driving and driven member is a gas such as air or a liquid such as an oil. Depending on the viscosity of the fluid and the differential of velocity between the driving and the driven members, an indication is attainable as the function of the bias towards zero of the indicator mechanism. This bias towards zero may be accomplished by unbalance of eccentric weights or by a spring member. Because of the inherent viscosity variations of liquids with temperature changes the use of liquid coupling in such a system has often been avoided. However, when an important function of the device coupled to the tachometer is also and similarly dependent on temperature variation, this viscosity variation may be used to advantage.

Therefore, an object of the present invention is to provide a simple and reliable tachometer which develops a more useful signal indication because of the fact that the thermal changes of viscosity of the fluid drive result in changes of speed of the system to attain such indication.

In accordance with one embodiment of our invention an eccentrically weighted indicator wheel is journaled within an enclosed chamber with the chamber being filled with a driving fluid such as mineral oil, kerosene or a combination thereof. The entire chamber is rotated to impart to the fluid a rotational torque with the chamber being rotated in accordance with the velocity of a process material such as a filmstrip being developed. Depending upon the viscosity of the fluid, the velocity of the rotation of the chamber will cause meaningful deflection of an indicator thereof as velocity variations of the process are dictated by ambient temperature variations comparable to those of the viscosity of the fluid drive.

The subject matter which is regarded as our invention is particularly pointed out and distinctly claimed in the concluding portion of this specification. The invention, however, as to its organization and operation, together with further objects and advantages thereof, will best be understood by reference to the following description taken in connection with the accompanying drawings in which:

Figure 1:
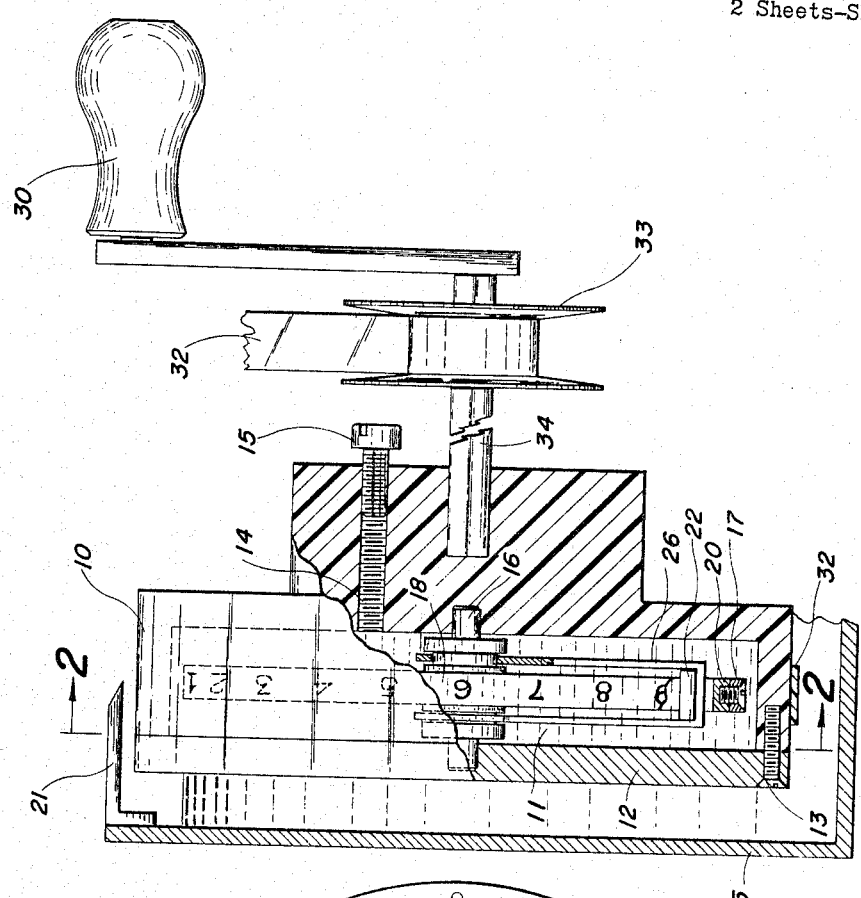
FIG. 1 is an elevation view, partially in section, of one embodiment of our invention.

Referring now to the drawings, wherein like numbers refer to similar parts, in FIG. 1 we have shown a casing 10 preferably made of a transparent material such as Plexiglas for defining a chamber 11. The Plexiglas casing 10 supports an end plate 12 secured thereto by means such as self-tapping screws 13 to entirely close the chamber 11 so that it may contain a fluid such as mineral oil, kerosene, a combination thereof or hydraulic fluids having similar viscosity characteristics. Thus, as the chamber is rotated, it imparts a rotary torque to the fluid. An aperture 14 for admitting the fluid is normally closed by a suitable means such as bolt 15.

Figure 2:
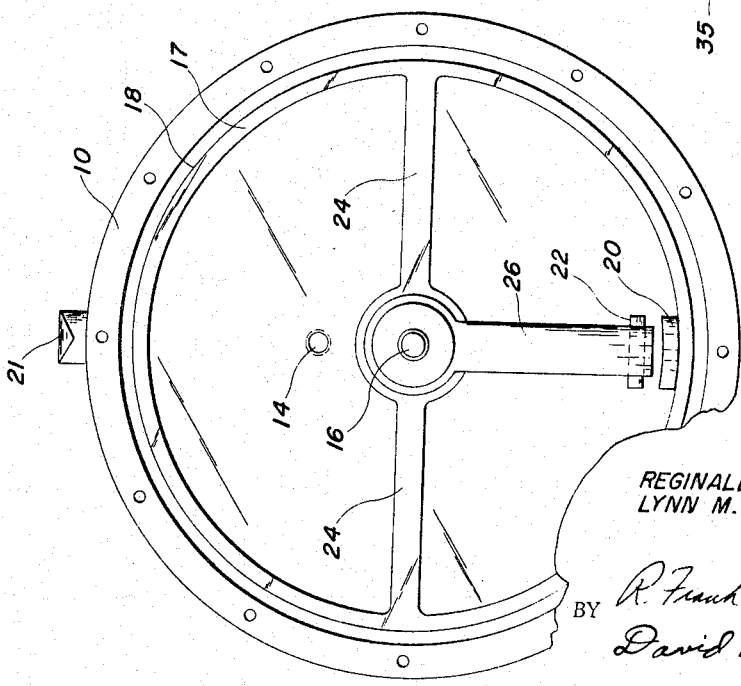
FIG. 2 is a cross-sectional view taken along line 2—2 of FIG. 1.

The indicator arrangement of our invention is placed within the chamber 11 and is supported on an axle 16 within the chamber 11 journaled coaxially in the end plate 12 and the casing 10. A wheel 17 is supported on the axle 16 and has on its surface spaced-apart numerals of other meter-like indications in the form of an annular strip 18. As shown in FIGS. 1 and 2, the wheel 17 is at rest. Thus, at the lowermost portion of the wheel 17 is an eccentric weight 20. The eccentric weight 20 tends to prevent rotation of the indicator strip 18 so that in standby position an indication of zero is shown by a pointer 21. Springs may also be used to bias the wheel 17 toward zero, but springs in liquid often tend to become contaminated and thereby get out of calibration. Also the calibration of a spring in the environment of present invention is somewhat more difficult than it first appears.

As will become apparent to those familar with fluid drives, simply using the single weight 20 results in instability of the system after about 90 degrees rotation. Such operation limits the indicator range. It is, therefore, preferred to provide a second weight 22 which is energized only after substantial deflection of the indicator strip 18.

As is shown more clearly in FIG. 2, the wheel 17 is provided with a plurality such as two spokes 24 which maintain the indicator strip 18 in coaxial relationship with the axle 16 and the chamber 11. Also journaled on the axle 16 is a basket 26 for supporting the additional weight 22. As the wheel 17 rotates more than 90 degrees, one of the spokes 24 engages the basket 26 to lift the weight 22 from the lowermost position indicated and thus establish increased bias in the 90 to 180 degree range to thereby increase the stable operation of our invention.

In one environment of the present invention, a crank 30 (FIG. 1) drives a take-up spool means directly for short length filmstrips 32, or a timing roller 33 of a film processor for longer filmstrips 33. The timing roller 33 serves a purpose much like that of a drive roller for a conventional tape recorder. The crank 30 also either directly by a shaft 34 or by gearing (not shown), drives the casing 10. In accordance with one use of our invention the filmstrip 32 is being processed and is being driven by the roller 33 at the end of the film developing process with the process being a dry-to-dry process.

As is a usual problem with chemical processes in general and film processing in particular, the process must be timed in accordance with the temperature of the processing fluids which are used. In accordance with our invention these fluids are thermally coupled to the tachometer arrangement. Preferably this coupling is in the form of having the two devices in the same environment. Under relatively static temperature conditions the devices may be simply in the same room. However, if the fluids of the process, or at least some of them, are transitory to the system, and if one or more is substantially transparent, the entire casing 10 is preferably immersed in one of the fluid tanks as indicated at 35. In such an arrangement it is feasible to use the lower portion of the annular surface of the casing 10 as a transport roller of the filmstrip 32, e.g., in the wash tank. In such case as one fluid is much more subject to change of process velocity because of temperature changes than another fluid, our tachometer arrangement should be placed in that fluid or at least in close thermal proximity therewith. If the fluid is subject to opacity considerations, a soft wiper 36 (FIG. 3) may be used to clear the region of the pointer 21.

Figure 3:
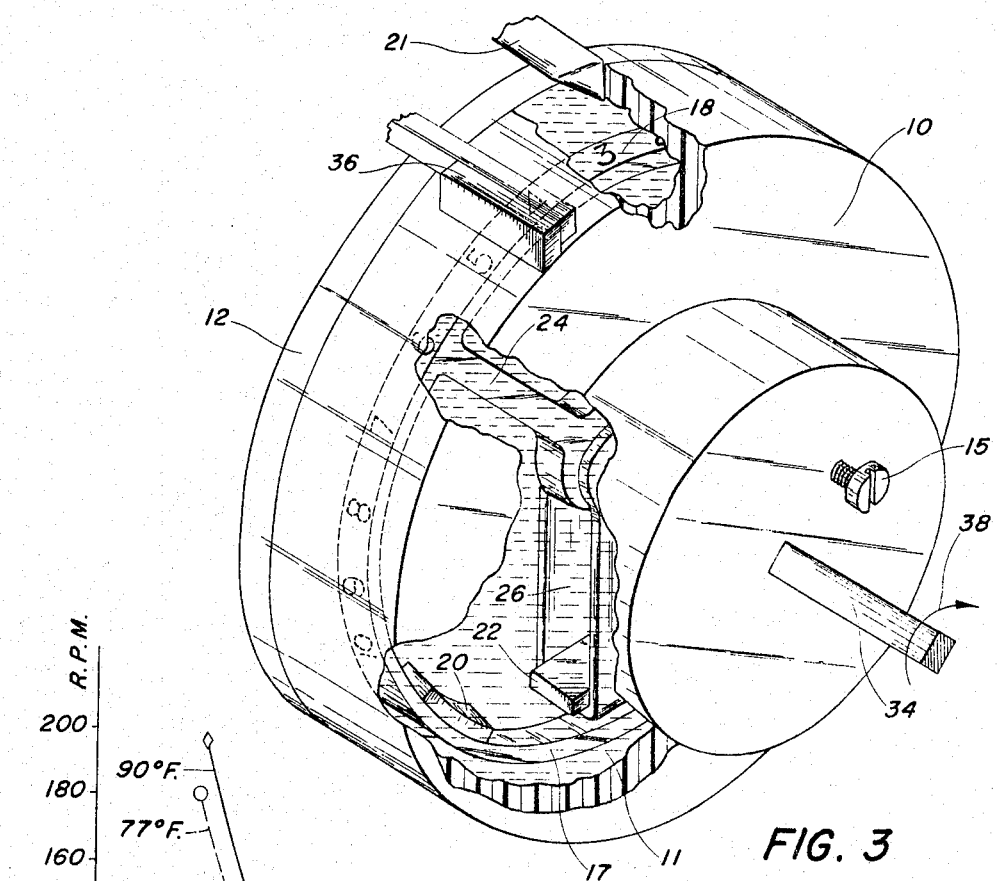
FIG. 3 is a perspective view of the embodiment shown in FIGS. 1 and 2.

Referring now to FIG. 3, partial deflection of the tachometer indicator strip 18 is more clearly shown. To attain such deflection, the shaft 34 is rotating, as indicated by an arrow 38, with sufficient angular velocity to rotate the liquid within the chamber 11. At the fluid viscosity and angular velocity illustration of FIG. 3, the indicator strips 18 provides an indication of 3. In this position, one spoke 24 is rotated upward slightly but not sufficiently so that the other spoke 24 has engaged the basket 26. However, the eccentric weight 20 is raised from dead center to provide a counteracting force equal to the effective torque of the rotating fluid in the chamber 11.

Obviously, the particular construction of the tachometer arrangement will greatly influence the indicator range of the system. For instance, the wheel 17 might be replaced with a disc having a flat outer indicator surface. Thus, if it were desired to have a higher process speed range, the spokes 24 may be made more streamlined or omitted, thereby reducing the fluid coupling between the indicator strip 18 and the casing 10. Also this may be otherwise modified in such instances where a lower process speed range is required by adding more spokes or vanes.

Figure 4:
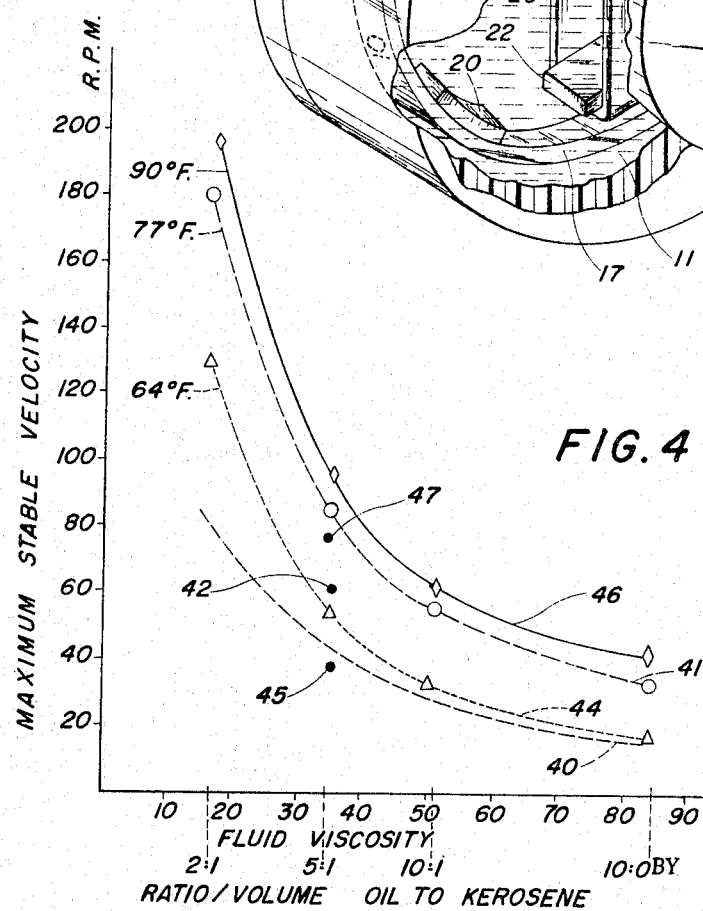
FIG. 4 is a graphical representation of several of the characteristics of the present invention.

Referring now to FIG. 4, several of the characteristics of the present invention are indicated in graphical form. The scale of the ordinates is in maximum stable velocity obtainable with the construction illustrated in FIGS. 1, 2, and 3 and using viscosities of a range from about 16 centipoise to about 85 centipoise on the scale of the abscissa. As illustrated by a dashed line 40, at about 16 centipoise, 84 r.p.m., the tachometer arrangement becomes unstable. On the other hand, at about 84 centipoise, the tachometer arrangement becomes unstable at only 17 r.p.m. Thus, depending on the size of the timing roller 33, the proper velocity for film processing and the like, a wide range of velocities are attainable by selected use of hydraulic fluids. Another dashed line 41 illustrates the stability range of a modified tachometer arrangement.

At 77° F. the dashed lines 40 and 41 are equivalent to a combination of mineral oil often sold under the trade name of Nujol and kerosene for the mixture ratios indicated on the second scale of the abscissa. Thus at 77° F. these mixture ratios will follow the curve of the dashed lines 40 and 41 depending upon the tachometer construction used. Other fluid mixtures may be selected to follow somewhat similar curves.

In order to better understand the operations of our invention, assume a particular film and developer process require a speed of processing of 11 feet per minute at 77° F. to process a particular frame on the filmstrip dry-to-dry in a particular configuration of film processor. Also, assume by way of example of the special utility of our invention, that at 77° F. such a film speed results from driving the crank 30 so that the chamber 11 rotates at 60 r.p.m. and that the chamber 11 is filled with five parts mineral oil and one part kerosene to have a centipoise of 35. Thus at 77° F. the crank 30 should drive the chamber to provide a speed indication of "7" on a total scale range of "10" as illustrated in FIGS. 1 and 3 and operating along the curve 41. This correct point of operation is shown at 42 on the graph of FIG. 4. The instructions for developing this type of film simply say "indicated cranking speed is '7' when using the selected process chemicals."

However, if it turns out that the next day is much cooler and the same combination of film and developing fluids are to be used, a lower speed of operation is requisite. Since our invention replaces complex heating equipment and other temperature regulating means, the film, to be properly developed, must be put through this process at a slower velocity to attain longer dwell time in each of the developing chemicals for an equivalent final product.

Assume that at 77° F. the proper dwell time is about 33% shorter than at 64° F., as is the case for most negative films. The proper velocity of our tachometer arrangement is therefore 40 r.p.m. at 64° F. Using the fluids suggested above for our tachometer arrangement, at 64° F., the stable operation follows a dotted curve 44. Thus, an indication of "7" results in operation at 39.2 r.p.m. as indicated at 45 which matches the required speed of 40 r.p.m. with surprising accuracy. Also, at higher temperatures such as 90° F. the indication of "7" provides a velocity of 77 r.p.m. as measured from a curve 46 and indicated at 47.

It is readily apparent from the above discussion that at 77° F. the filmstrip 32 will pass through the processor at 11 f.p.m., at 64° F. it will pass through at 7⅓ f.p.m. and at 90° F. it will pass through at 14.1 f.p.m. when the indication of "7" is maintained.

Although the present invention has been discussed as being visually interpreted, it is apparent that other sensing means may be used with the result that film processors and the like may be automatically operated by error signals resulting from the indication detected. However, we have in mind the use of our invention in a simple form for providing an easily usable signal to a person hand cranking a film processor in his home whereby a visual indication is most satisfactory.

While we have shown and described particular embodiments of the present invention, other modifications may occur to those skilled in this art. We intend, therefore, to have the appended claims cover all modifications which fall within the true spirit and scope of our invention.

We claim:
1. A tachometer suitable for indicating suitable speed of operation of a process subject to speed variations as a positive function of temperature variations comprising:
   a casing defining cylindrical chamber and having a transparent annular surface;
   means for coupling said casing to be rotated at velocities in accordance with the speed of the process subject to increases of speed with increases of temperature;
   a wheel rotatable coaxially within the chamber;
   indicator means on said wheel arranged to be visible through said casing;
   means for biasing said wheel to obtain an indication of zero when said casing is not rotating; and
   a liquid within the chamber suitable for coupling said casing to said wheel in accordance with the effective viscosity thereof, the fluid coupling being subject to temperature variations such that a rotational velocity indication at a low temperature represents a slower process speed than the same indication at a higher temperature whereby operation at a particular indication will provide proper speed of operation of the process over a range of temperatures.

2. A tachometer as in claim 1 wherein said wheel is provided with spokes which act as vanes to deflect said wheel during rotation of said liquid.

3. A tachometer as in claim 2 having an eccentric weight journaled coaxially with said wheel to be displaced by engagement of one of said spokes only after rotation of said wheel about 90° and wherein said biasing means is an eccentric weight means secured to said wheel.

4. A tachometer suitable for indicating a suitable speed of operation of a process subject to speed increases as a function of temperature increases, comprising:
- a casing defining a cylindrical chamber having a transparent annular surface;
- a cranking means operable to rotate said casing and simultaneously to control the effective duration of the process;
- indicator means rotatable coaxially within the chamber and arranged to be visible through said casing;
- means for biasing said indicator means to obtain zero deflection thereof when said casing is not rotating;
- a hydraulic fluid within the chamber for coupling said casing to said indicator means in accordance with the effective viscosity thereof, the thermal variations of the viscosity of said fluid being selected to co-operate with the configurations of said casing and said indicator means so that an indication at a low temperature represents slower velocity than the same indication at a higher temperature by an amount corresponding to the change of speed required by the procses for similar temperature variations whereby operation of said cranking means to maintain a particular indication will provide proper duration of operation of the process over a range of temperatures.

5. A tachometer in accordance with claim 4 wherein said casing is placed within a processing fluid being used in the process to thereby be thermally coupled thereto so that viscosity variations of said fluid correspond to chemical variations of said processing fluid.

6. A tachometer for indicating a proper speed of operation of a film developing process subject to predictable film velocity increases as a function of temperature increases, comprising:
- a casing defining a cylindrical chamber and having a transparent annular surface;
- cranking means for driving a film through the developing process at continuously variable velocities and for simultaneously rotating said casing at corresponding velocities;
- a wheel journaled to rotate coaxially within the chamber, said wheel being eccentrically weighted to obtain a zero position;
- indicator means on said wheel arranged to be visible through said casing to provide a zero indication at the zero position of said wheel and correspondingly higher indications as said wheel is deflected by rotation of said casing;
- stationary pointer means adjacent to said casing for facilitating the reading of said indicator means;
- a hydraulc fluid within the chamber suitable for providing a fluid coupling between said casing and said wheel in accordance with the effective viscosity thereof, the viscosity of said fluid being subject to temperature variations in accordance with the fluid coupling such that a velocity indication at a low temperature is slower than the same indication at a higher temperature by an amount corresponding to the change of speed of the developing process; and
- means for thermally coupling said fluid to the chemicals of the developing process whereby operation at a particular indication will provide proper operation of the process over a range of temperatures.

7. A tachometer for indicating a proper speed of operation of a film developing process subject to predictable film velocity increases as a function of temperature increases, comprising:
- a casing defining a cylindrical chamber;
- cranking means for driving a film through the developing process at continuously variable velocities and for simultaneously rotating said casing at corresponding velocities;
- indicator means rotatable within the chamber and detectable through said casing to provide a zero indication at the zero rotation of said casing and correspondingly higher indications as said casing is rotated;
- a hydraulic fluid within the chamber suitable for providing a fluid coupling between said casing and said indicator means in accordance with the effective viscosity thereof; and
- means for thermally coupling said fluid to a chemical of the developing process to vary the viscosity of said fluid in accordance with the change of process speed of the chemical whereby operation at a particular indication will provide proper operation of the process speed over a range of temperatures.

8. A tachometer suitable for indicating a suitable speed of operation of film developing process subject to predictable film velocity increases as a function of temperature increases, comprising:
- a casing defining an enclosed cylindrical chamber;
- a cranking means operable to rotate said casing and simultaneously to control the speed of the process;
- indicator means rotatable coaxially within the chamber;
- means for biasing said indicator means to obtain zero deflection thereof when said casing is not rotating and progressively larger deflections as the velocity of rotation increases; and
- a hydraulic fluid within the chamber for coupling said casing to said indicator means in accordance with the effective viscosity thereof, the thermal variations of the viscosity of said fluid being selected to co-operate with the configurations of said casing and said indicator means so that an indication at a low temperature represents a slower velocity than the same indication at a higher temperature by an amount corresponding to the change of velocity required by the developing process for similar temperature variations whereby operation of said cranking means to obtain a particular indication will provide suitable speed of operation of the process over a range of temperatures.

9. A tachometer system which will provide the same indication at different velocities as a function of temperature variation and being suitable for indicating proper speed of a temperature responsive process operated in accordance with the velocity of a rotatable body in a selected process zone, comprising:
- a tachometer having a fluid coupling for developing signal information, the fluid being characterized as having a viscosity variation with temperature change to develoy a constant signal over a range of tachometer velocities as a function of temperature change in a manner corresponding to the temperature responsive character of the process; and
- means coupling said tachometer to the rotatable body in such a location that said tachometer fluid is subjected to temperature variations corresponding to those of the selected zone whereby said tachometer will provide a single indication over a range of body rotational velocities as a function of temperature changes to thus indicate a proper process speed.

References Cited by the Examiner
UNITED STATES PATENTS

| | | | |
|---|---|---|---|
| 627,589 | 6/1899 | Moon | 73—524 |
| 630,299 | 8/1899 | Moon | 73—524 |

NORTON ANSHER, *Primary Examiner.*

C. B. PRICE, *Assistant Examiner.*